United States Patent [19]
Kirchhoff-Stewens

[11] Patent Number: 5,950,661
[45] Date of Patent: Sep. 14, 1999

[54] MANIFOLD FOR DISTRIBUTING OR MIXING FLUIDS

[75] Inventor: Ludwig Kirchhoff-Stewens, Werdohl, Germany

[73] Assignee: Rotelmann GmbH & Co., Werdohl, Germany

[21] Appl. No.: 09/057,072

[22] Filed: Apr. 8, 1998

[30] Foreign Application Priority Data

Apr. 11, 1997 [DE] Germany .................. 297 06 400 U

[51] Int. Cl.⁶ .................................................. F16K 11/22
[52] U.S. Cl. ........................ 137/269; 137/271; 137/884
[58] Field of Search ................................ 137/269, 271, 137/884

[56] References Cited

U.S. PATENT DOCUMENTS

| | | | |
|---|---|---|---|
| 3,654,960 | 4/1972 | Kiernan | 137/271 X |
| 3,934,605 | 1/1976 | Legris | 137/884 X |
| 4,230,143 | 10/1980 | Dettmann et al. | 137/884 X |
| 5,769,110 | 6/1998 | Ohmi et al. | 137/271 X |
| 5,803,123 | 9/1998 | Bell et al. | 137/884 |
| 5,810,115 | 9/1998 | Mismas | 137/884 X |

*Primary Examiner*—Kevin Lee
*Attorney, Agent, or Firm*—Herbert Dubno; Andrew Wilford

[57] ABSTRACT

A manifold has a plurality of main blocks each formed with a pair of oppositely directed and parallel flat end faces extending perpendicular to an axis and with an axially through-going main passage opening generally centrally at each face. At least one of the blocks is formed with a branch passage extending transversely from the respective main passage. A valve built into the one block controls flow along the respective branch passage. Connectors are provided on the blocks at outer ends of the passages. The blocks are secured together with their main passages coaxial and their end faces bearing in a fluid-tight manner on each other. The blocks are rectangularly parallepipedal. In addition the main passages are all substantially identical. The one module has a lateral extension through which the branch passage extends and in which the valve is mounted. Respective O-rings are compressed between the end faces of adjacent blocks.

13 Claims, 3 Drawing Sheets

MANIFOLD FOR DISTRIBUTING OR MIXING FLUIDS

FIELD OF THE INVENTION

The present invention relates to a manifold. More particularly this invention concerns a manifold that is used to distribute a fluid to a plurality of users or to mix together a plurality of liquids from respective supplies.

BACKGROUND OF THE INVENTION

A standard manifold that connects for example a single source of pressurized fluid to a plurality of users or loads comprises a single block of metal formed with a main feed passage connected to the source and a plurality of transverse branch passages each connected to a respective user or load. Valves may be built into the block for some of the passages.

Such manifolds are therefore normally custom-built for the particular application. Thus they are expensive and, if needs change, must be completely replaced with a new such manifold assembly.

OBJECTS OF THE INVENTION

It is therefore an object of the present invention to provide an improved fluid-distributing or -mixing manifold.

Another object is the provision of such an improved fluid-distributing or -mixing manifold which overcomes the above-given disadvantages, that is which is of simple construction and that can be adapted to different applications.

SUMMARY OF THE INVENTION

A manifold has according to the invention a plurality of main blocks each formed with a pair of oppositely directed and parallel flat end faces extending perpendicular to an axis and with an axially throughgoing main passage opening generally centrally at each face. At least one of the blocks is formed with a branch passage extending transversely from the respective main passage. A valve built into the one block controls flow along the respective branch passage. Connectors are provided on the blocks at outer ends of the passages. The blocks are secured together with their main passages coaxial and their end faces bearing in a fluid-tight manner on each other.

Thus this system allows a manifold to be made up for virtually any application, simply by stacking together the requisite number of blocks. This can be done in the shop or even in the field, and it is possible at a later date to disassemble and rebuild a particular manifold when needs change.

The blocks according to the invention are rectangularly parallelepipedal. In addition the main passages are all substantially identical. The one module has a lateral extension through which the branch passage extends and in which the valve is mounted. Respective O-rings are compressed between the end faces of adjacent blocks.

In accordance with the invention tie rods extend axially along the blocks to secure them together. The blocks are rectangularly parallelepipedal and have corners formed with axially throughgoing bores. The tie rods pass through the bores and each have a head end and an opposite threaded end. The head ends are seated in one of two end pieces axially flanking the stack of main blocks and the threaded ends are seated in the other of the end pieces. To this end one of the end pieces is provided with threaded plugs in which the threaded ends are seated and the other of the end pieces is formed with stepped bores in which the headed ends are recessed.

To make up a very long manifold, or one longer than a standard tie rod, a middle block is engaged between two of the main blocks and formed with a passage aligned with the passages of the main blocks. The middle block is further formed with axially throughgoing bores aligned with the bores of the main blocks. The bores of the middle block are each provided with a threaded anchor for a threaded end of a respective one of the tie rods and with a shoulder for a headed end of a respective one of the tie rods.

Another of the blocks has a branch passage and is provided with a threaded cap externally closing same so that the cap can be removed for connection of a gauge or withdrawal of fluid from the passages.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
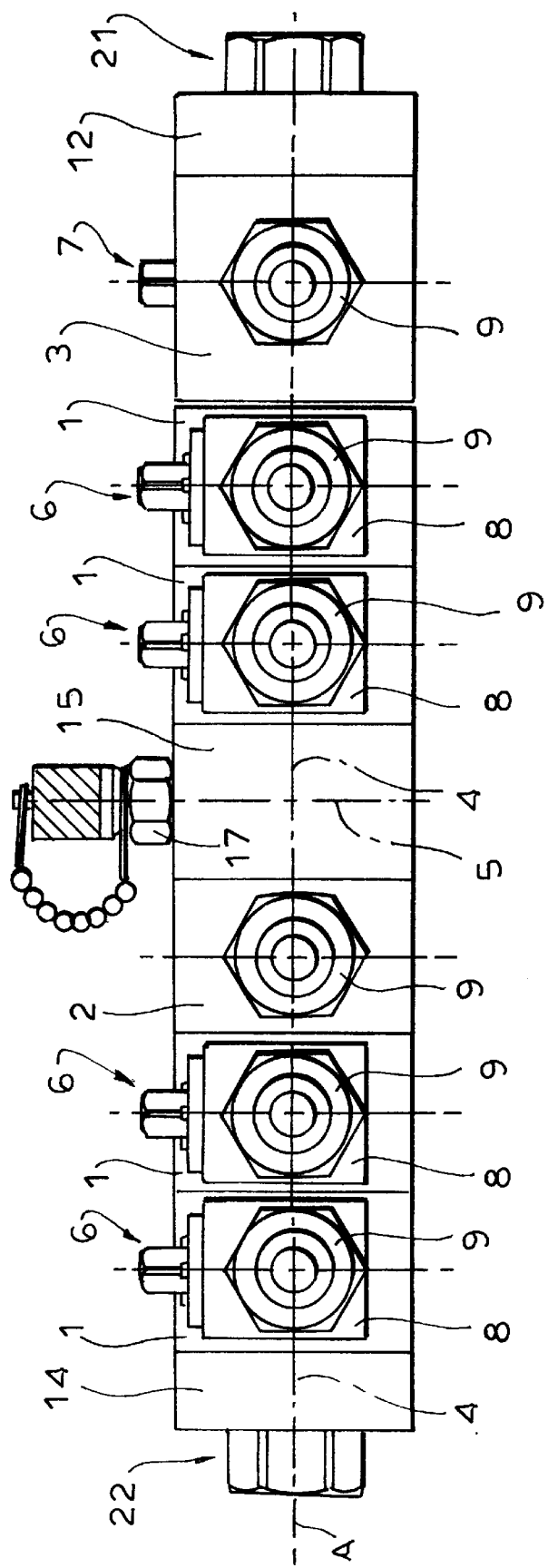
FIG. 1 is a side view of the manifold according to the invention.

As seen in the drawing a manifold according to the invention has basically three different modules or blocks 1, 2, and 3, a pair of end blocks 12 and 14, and a middle connector block 15 all formed basically as rectangularly parallelepipedal metallic bodies having planar flatly abutting end faces 10 perpendicular to an axis A. The various blocks 1, 2, 3, 12, and 14 are formed centered on the axis A with identical throughgoing main bores or passages 4 of cylindrical shape indicated by dot-dashed line 4. O-rings 18 are provided around the passages 4 where the faces 10 abut, normally set into a circular axially open annular groove in one of the end faces 10.

The blocks 1, 2, 3, and 15 are all formed with transverse branch bores or passages shown by dot-dash line 5 that open into the respective main passage 4. Each block or module 1 is provided with a lateral extension 8 through which the respective branch passage 5 extends and provided with a valve or cock 6 that can block flow through the respective passage 5. The block or module 3 is provided with another such shutoff valve or cock 7 that can control or block flow through the respective main passage 4. The transverse passage 5 of the block 2 opens directly to the exterior. All of the branch passages 5 except that of the block 15 end at threaded connectors 9 to which fluids to be mixed can be fed or from which liquid can be tapped. The branch passage 5 of the block 15 has an outer end closed by a threaded cap or connector 17 so that fluid samples may be taken or a gauge may be connected. Threaded connectors 21 and 22 are provided on the end pieces 12 and 14 to allow connection to their main passages 4.

To maintain the assembly together, the blocks 1, 2, 3, and 15 are provided in their corners with throughgoing cylindrical bores 19 parallel to the axis A. The one end piece 14 is provided in its corners with axially throughgoing stepped end bores 23 and the other end piece 12 is fitted in its corners with removable plugs 13 of cylindrical shape with transverse threaded bores. Threaded tie screws 11 have their heads, which may be provided with Allen recesses, seated in the stepped bores 23 and threaded shanks screwed into the transverse threaded bores of the cylindrical plugs 13. In the illustrated embodiment the center block 15 is formed in its corners with axially throughgoing stepped bores 20 and also is provided in the large-diameter part of each such bore 20 with a removable threaded plug 16. Thus four of the tie rods 11 have their heads seated in the one end piece 14 and their opposite ends screwed into the plugs 16, and the tie rods 11 threaded into the plugs 13 of the end piece 12 have their heads seated in the stepped bore 20. This makes it possible to assemble a manifold of virtually any length with standard components by using any number of middle blocks 15.

Figure 2:
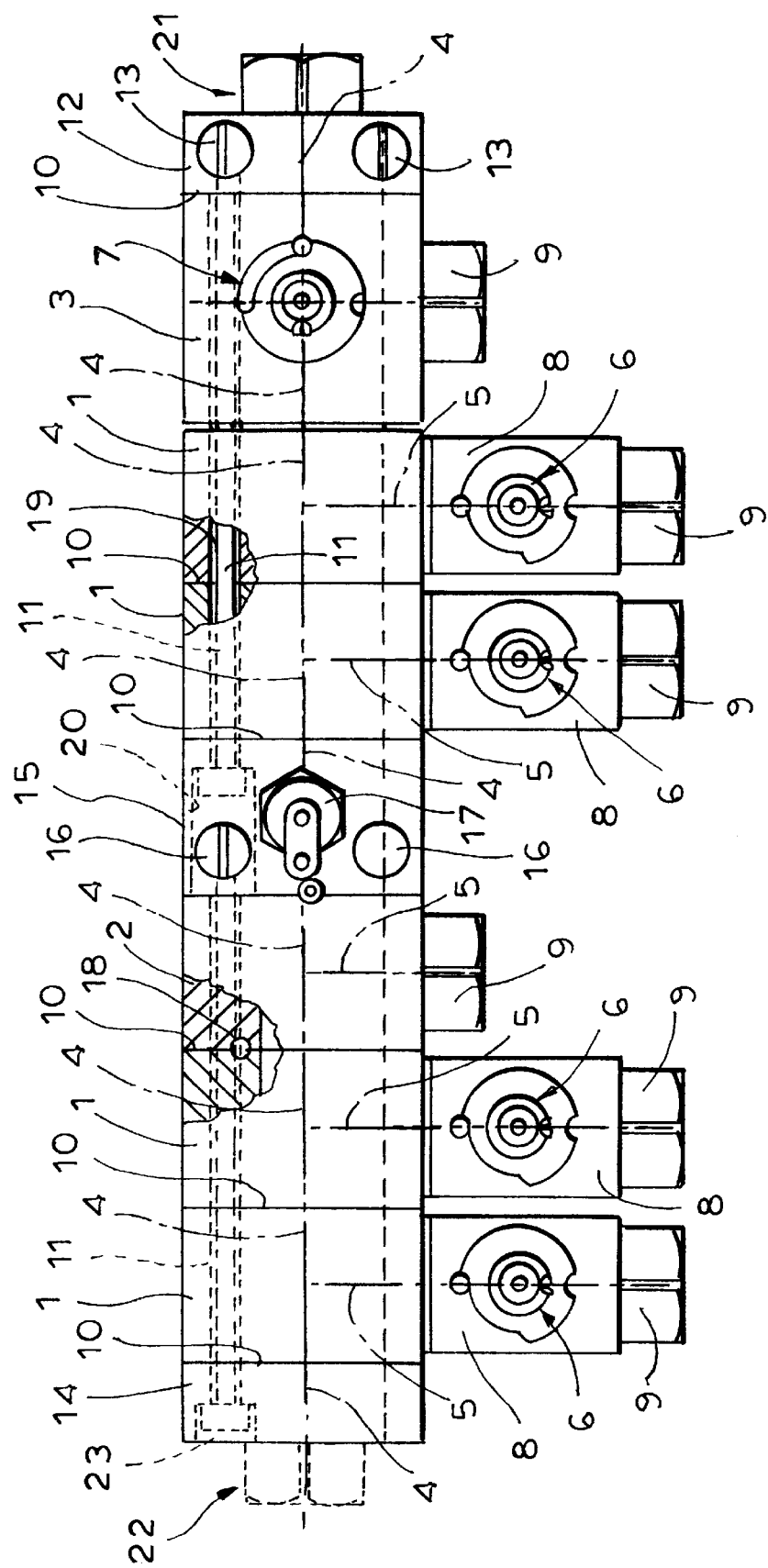
FIG. 2 is a top partly broken-away view of the manifold.
Figure 3:
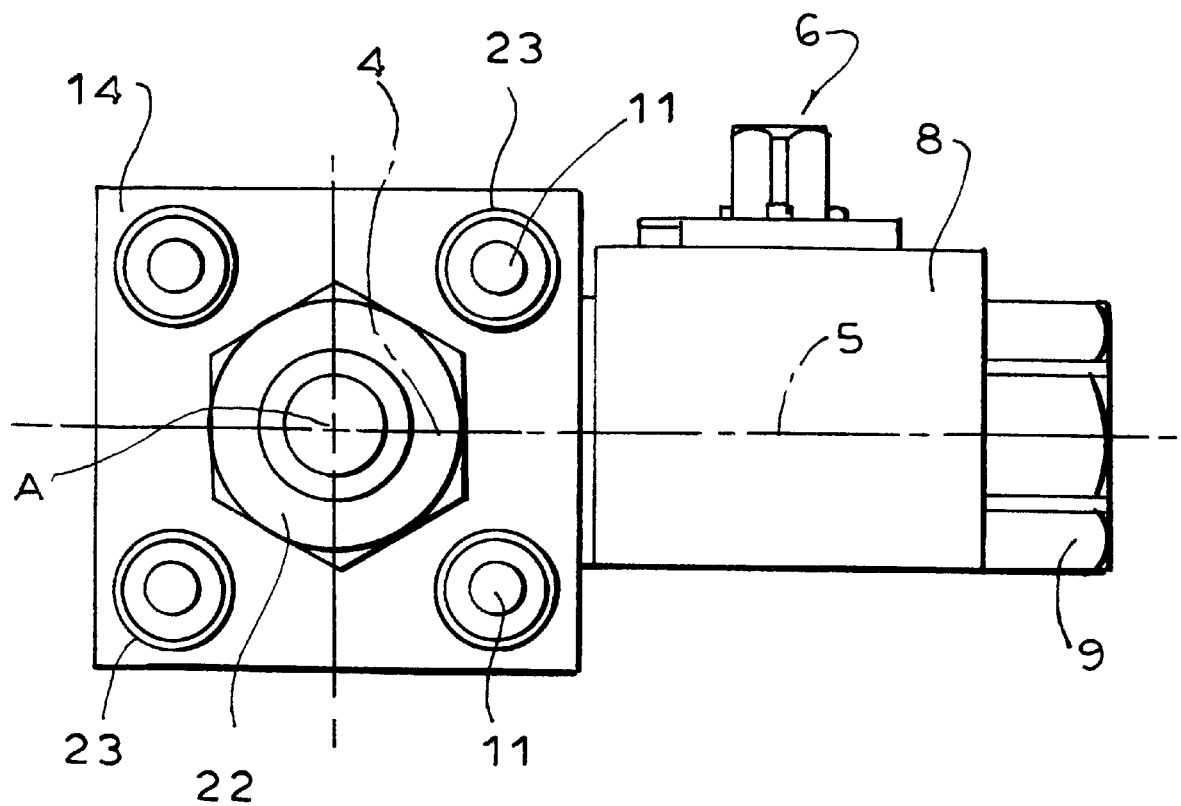
FIG. 3 is an end view of the manifold.

Such an arrangement is assembled from right to left as shown in FIGS. 1 and 2. The piece 15 and the blocks 1 and 3 to its right are secured together by their four tie rods, and then the plugs 16 are set in place and the left-hand elements are assembled together in the same way. It is possible to connect, for example, a pressurized fluid source to either end fitting 21 or 22 and a load to the other fitting 21 or 22 while connecting other supplies and/or loads to the side connectors 9 to or from most of which flow can be controlled via the valves 6. Flow along the main passage can be controlled by the valve 7 and fluid can be tapped or pressure can be monitored by connection to the normally capped connector 17

I claim:

1. A manifold comprising:
   a plurality of rectangularly parallelepipedal main blocks each formed with a pair of oppositely directed and parallel flat end faces extending perpendicular to an axis, with corners formed with axially throughgoing bores, and with an axially throughgoing main passage opening generally centrally at each face, at least one of the blocks being formed with a branch passage extending transversely from the respective main passage;
   a valve built into the one block and controlling flow along the respective branch passage;
   connectors on the blocks at outer ends of the passages;
   two end pieces axially flanking the blocks, and means including respective tie rods extending through the bores and each having a head end seated in one of the end pieces and an opposite threaded end seated in the other of the end pieces for securing the blocks together with their main passages coaxial and their end faces bearing in a fluid-tight manner on each other.

2. The manifold defined in claim 1 wherein the main passages are all substantially identical.

3. The manifold defined in claim 1 wherein the one block has a lateral extension through which the branch passage extends and in which the valve is mounted.

4. The manifold defined in claim 1, further comprising respective O-rings compressed between the end faces of adjacent blocks.

5. The manifold defined in claim 1 wherein one of the end pieces is provided with threaded plugs in which the threaded ends are seated.

6. The manifold defined in claim 1, further comprising a middle block engaged between two of the main blocks and formed with a passage aligned with the passages of the main blocks, the middle block being further formed with axially throughgoing bores aligned with the bores of the main blocks, the bores of the middle block each being provided with a threaded anchor for a threaded end of a respective one of the tie rods and with a shoulder for a headed end of a respective one of the tie rods.

7. The manifold defined in claim 1 wherein the end faces are square.

8. A manifold comprising:
   a plurality of main blocks each formed with a pair of oppositely directed and parallel flat end faces extending perpendicular to an axis and with an axially throughgoing main passage opening generally centrally at each face, at least one of the blocks being formed with a branch passage extending transversely from the respective main passage, another of the blocks having a branch passage;
   a threaded cap externally closing the branch passage, whereby the cap can be removed for connection of a gauge or withdrawal of fluid from the passages;
   a valve built into the one block and controlling flow along the respective branch passage;
   connectors on the blocks at outer ends of the passages; and
   means for securing the blocks together with their main passages coaxial and their end faces bearing in a fluid-tight manner on each other.

9. The manifold defined in claim 8 wherein the blocks are rectangularly parallelepipedal.

10. The manifold defined in claim 8, wherein the securing means includes a tie rod extending axially along the blocks.

11. The manifold defined in claim 10 wherein the blocks are rectangularly parallelepipedal and have corners formed with axially throughgoing bores each receiving a respective such tie rod each having a head end and an opposite threaded end, the manifold further comprising
   two end pieces axially flanking the blocks, the head ends being seated in one of the end pieces and the threaded ends in the other of the end pieces.

12. The manifold defined in claim 11 wherein one of the end pieces is formed with stepped bores in which the headed ends are recessed.

13. A manifold comprising:
   a plurality of rectangularly parallelepipedal main blocks each formed with
      a pair of oppositely directed and parallel planar end faces extending perpendicular to an axis,
      an axially throughgoing main passage opening generally centrally at each face, and
      a plurality of axially throughgoing bores, at least one of the blocks being formed with a branch passage extending perpendicularly from the respective main passage, the blocks abutting one another axially in a row;
   a valve built into the one block and controlling flow along the respective branch passage;
   threaded connectors on the blocks at outer ends of the passages;
   a pair of end pieces axially flanking the main blocks; and
   a plurality of tie rods extending through the bores and having heads recessed in one of the end pieces and opposite threaded ends anchored in the other of the end pieces for securing the blocks together with their main passages coaxial and their end faces bearing in a fluid-tight manner on each other.

* * * * *